Nov. 24, 1964 G. M. SNYDER 3,157,971
SIZE CONTROL DEVICE ADAPTABLE TO DIFFERENT DIAMETERS
Filed Feb. 7, 1963 5 Sheets-Sheet 1
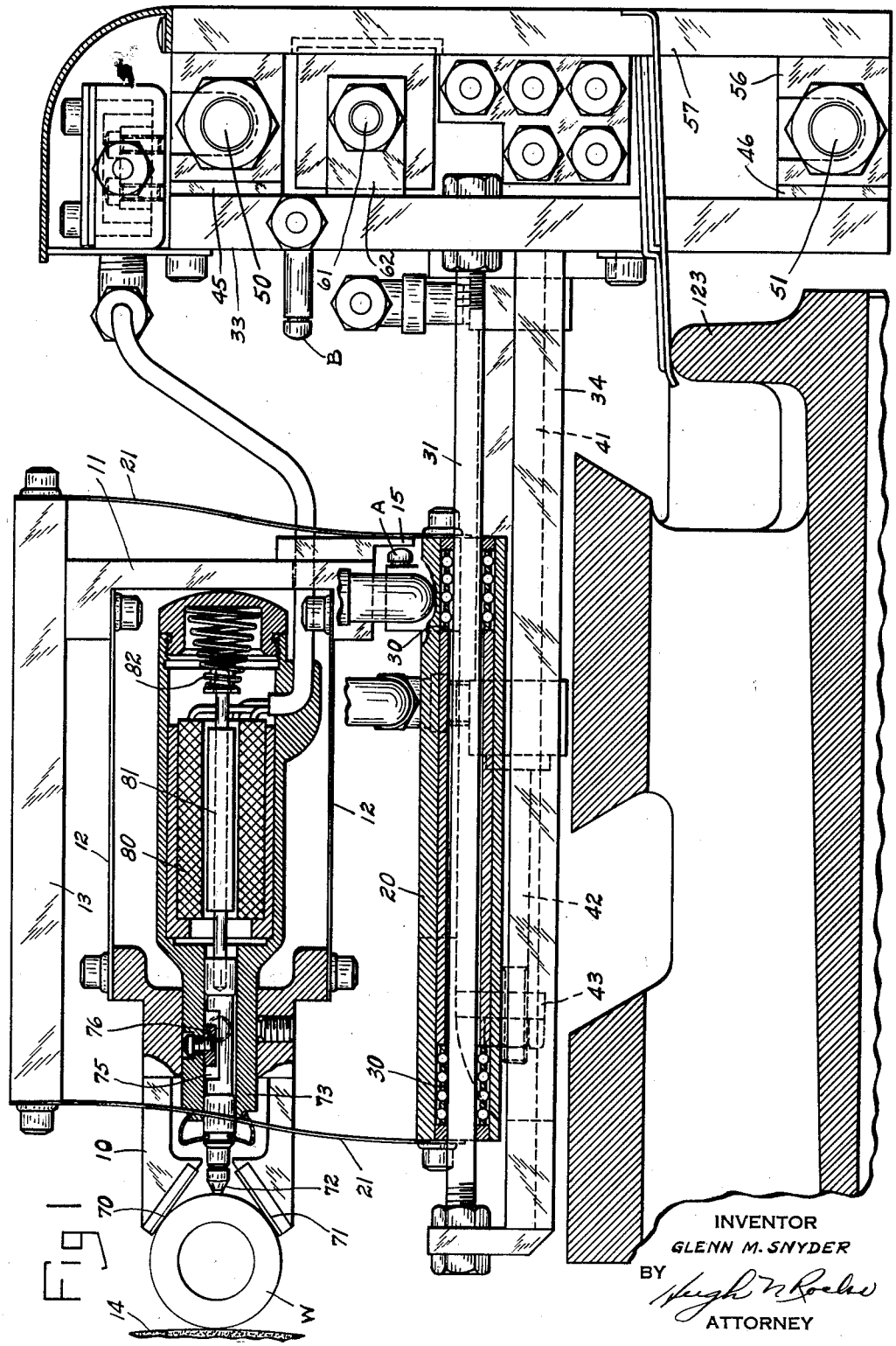
INVENTOR
GLENN M. SNYDER
BY
ATTORNEY

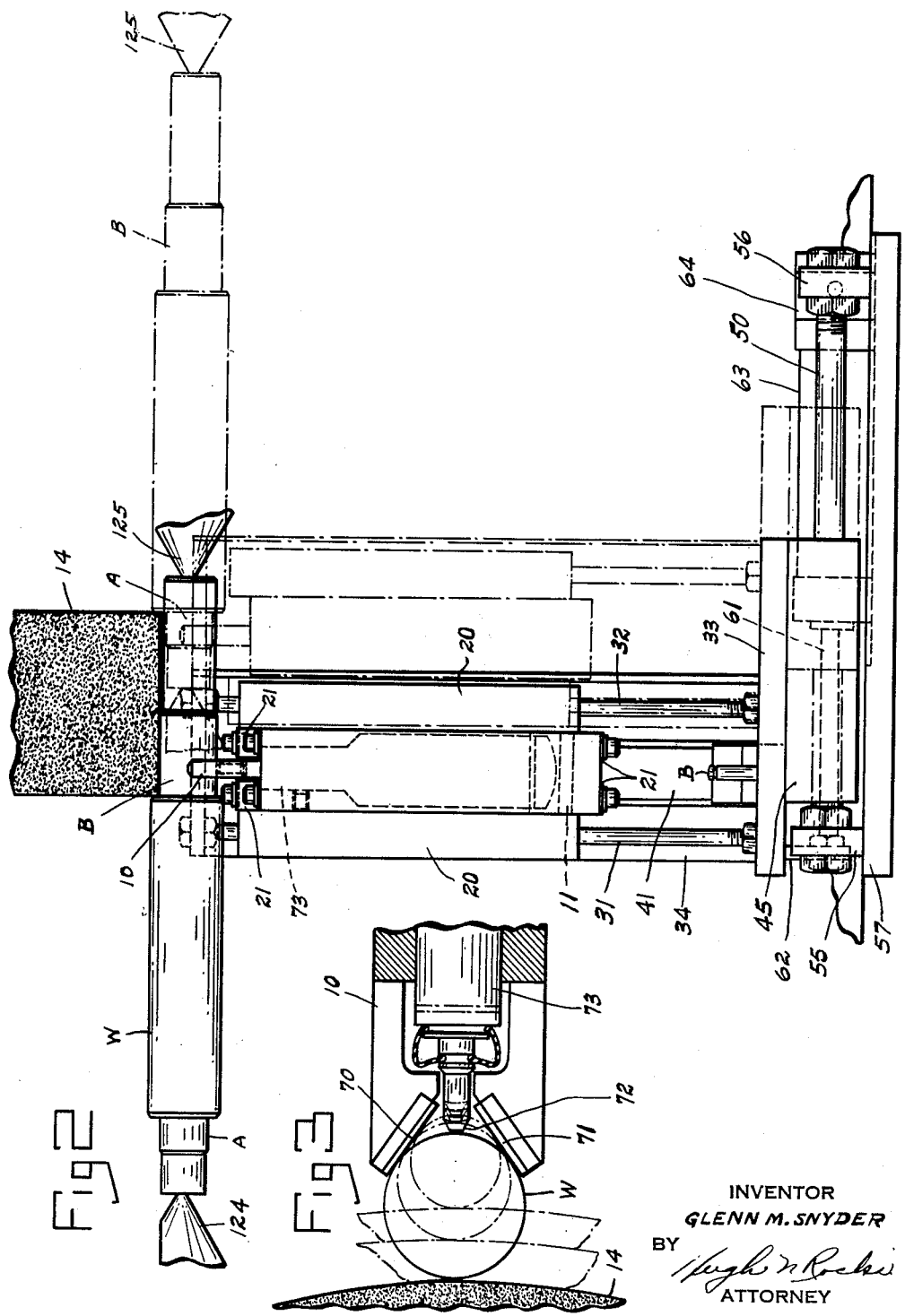

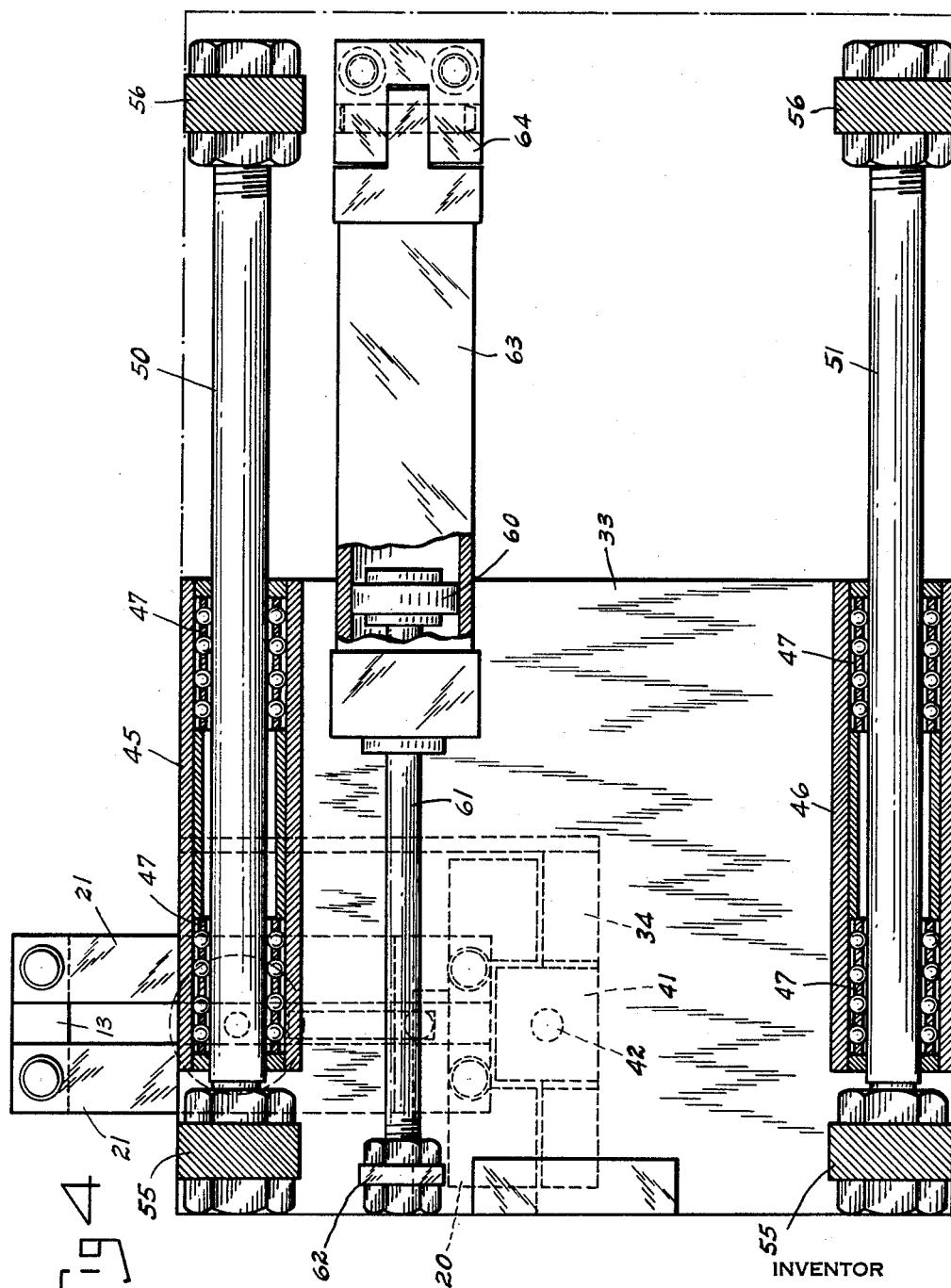

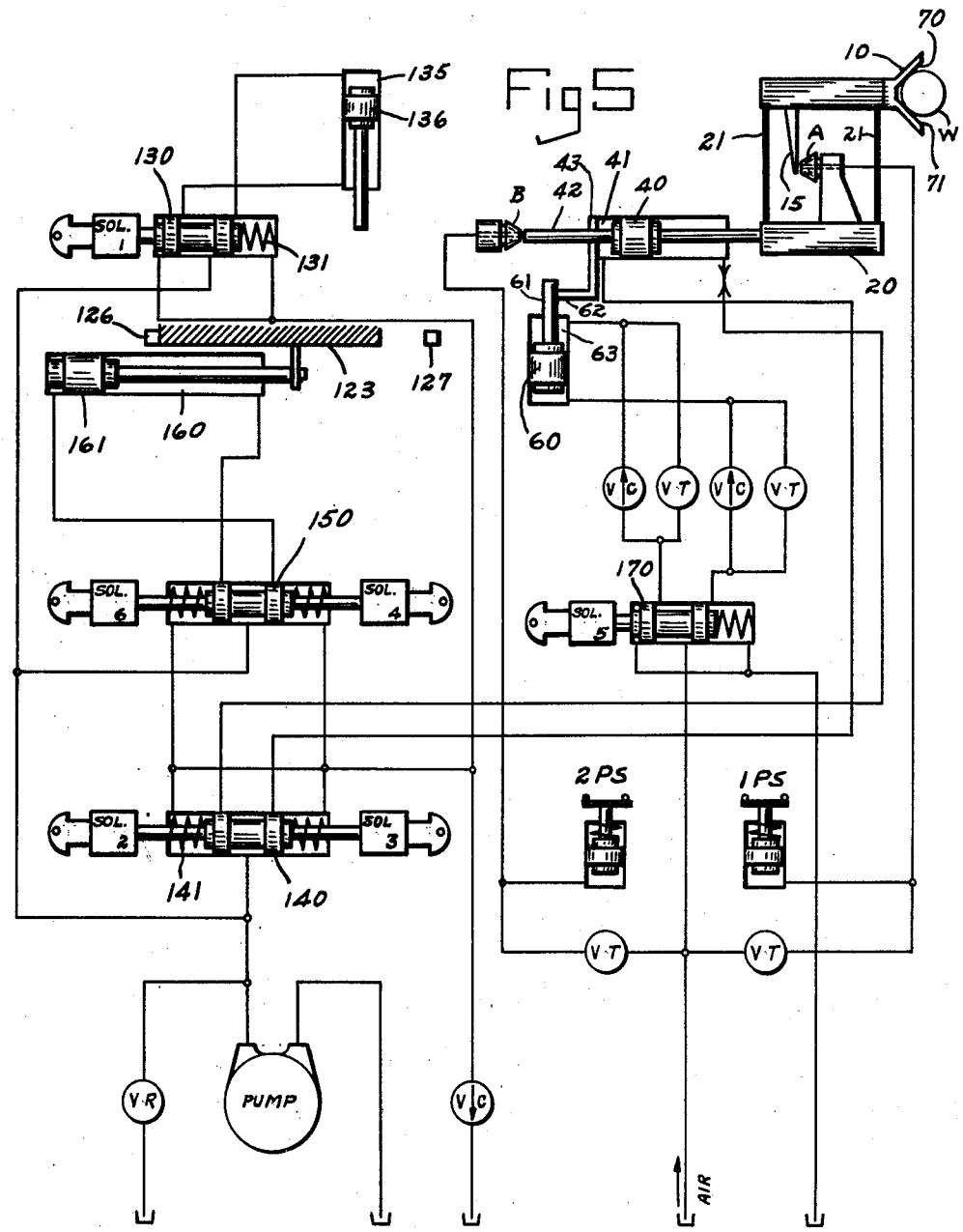

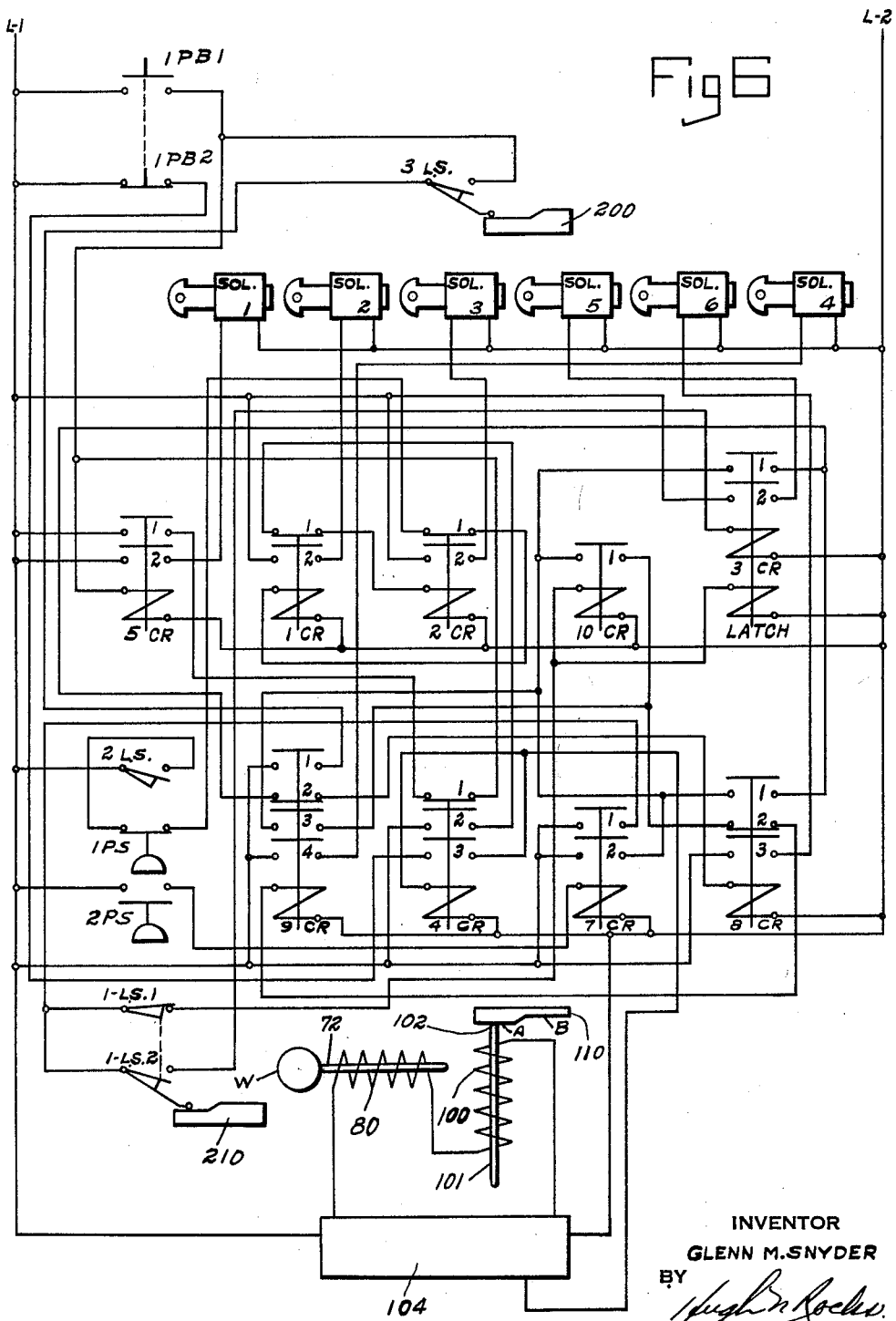

United States Patent Office 3,157,971
Patented Nov. 24, 1964

3,157,971
SIZE CONTROL DEVICE ADAPTABLE TO DIFFERENT DIAMETERS
Glenn M. Snyder, Waynesboro, Pa., assignor to Landis Tool Company, Waynesboro, Pa.
Filed Feb. 7, 1963, Ser. No. 256,865
10 Claims. (Cl. 51—165)

This invention relates to grinding machines, particularly to size control apparatus for grinding multiple diameter workpieces.

The conventional method of controlling size on multiple diameter workpieces is to provide either a visual or automatic caliper preset for each diameter.

It is, therefore, an object of the present invention to provide an automatic caliper which is capable of measuring a relatively wide range of work diameters without manual adjustment.

Another object is to provide means for automatically presetting the caliper for selected diameters.

Another object is to provide means for automatically setting the caliper for the particular diameter to be ground.

Another object is to provide means whereby the caliper remains normally in position opposite one side of the grinding wheel.

Another object is to provide means for shifting the caliper to a position opposite the other side of the grinding wheel when that side of said grinding wheel is performing the grinding operation.

Another object is to provide means for changing the position in which the caliper signals completion of the grinding operation.

Another object is to provide means for returning the work carriage and caliper to starting position.

Another object is to provide means to maintain uniform pressure of the caliper on the work regardless of the size of the work or the change in size.

For the purpose of illustration, the drawings and specification relate to means for grinding two end portions of a workpiece, each of a different diameter. The invention is not limited to grinding machines. It is equally applicable to similar operations on other types of machine tools.

FIG. 1 is a right hand end elevation of the caliper mounting.

FIG. 2 is a plan view of the caliper mounting showing its relation to the grinding wheel when grinding each of two end portions of a workpiece.

FIG. 3 is a partial right hand view showing the relation of the caliper mounting to different work diameters.

FIG. 4 is a front elevation, partly in section, showing the guide members and fluid motor for traversing the caliper from one position to another.

FIG. 5 is a hydraulic diagram.

FIG. 6 is an electric diagram.

Workpiece W is rotatably supported on work centers 124 and 125 on work carriage 123.

Caliper 10 is attached to vertical support member 11 by vertically spaced parallel springs 12. Support member 11 is suspended from a horizontal support member 13 which, in turn, is mounted on slide 20 by means of horizontally spaced parallel springs 21.

Slide 20 contains a pair of ball sleeves 30, one at each side for slidably supporting the caliper assembly on guide rods 31 and 32. Guide rods 31 and 32 are supported on carriage 123 consisting of a vertical member 33 and horizontal member 34.

Means for advancing caliper 10 toward and from workpiece W consists of a piston 40 in cylinder 41. Cylinder 41 is mounted on vertical member 33 and attached to slide 20 by means of piston rod 42 and bracket 43.

Vertical member 33 has a pair of slide members, 45 at the top and 46 at the bottom. Each slide member 45 and 46 contains a pair of axially spaced ball sleeves 47 for slidably supporting vertical member 33 on guide rods, 50 for the upper and 51 for the lower. Guide rods 50 and 51 are attached to lugs 55 and 56 on vertical member 57. Vertical member 57 is mounted on the machine bed (not shown).

The means for shifting members 33 and 34 on guide rods 50 and 51, consists of piston 60 having a piston rod 61 attached to vertical member 33 by means of bracket 62. Piston 60 is slidably mounted in cylinder 63 pivotally mounted in bracket 64 attached to vertical member 57.

Caliper 10 has a pair of work engaging shoes 70 and 71. Work engaging probe 72 is slidably supported in housing 73 which, in turn, is mounted in caliper 10. Probe 72 has a slot 75. Stop member 76 mounted in housing 73 extends into slot 75 to limit the endwise movement of probe 72. The other end of housing 73 is enlarged to receive a transducer consisting of coil 80 and core 81. One end of core 81 is attached to probe 72, the other end is attached to spring 82 which urges core 81 and probe 72 in the direction of workpiece W.

Coil 80 is connected electrically to coil 100 of a master transducer consisting of core 101. One end of core 101 has a probe portion 102 which extends into engagement with positioning bar 110 having portions A and B corresponding to portions A and B of workpiece W.

The means for changing probe 72 to measure a different diameter may consist of holding probe portion 102 yieldingly against positioning bar 110. When, as a result of the grinding operation, probe 72 reaches a position corresponding to the position of probe portion 102 as determined by positioning bar 110, a signal is provided to stop the grinding operation.

A master probe and transducer 100, 101 or equivalent reference device may be positioned by any suitable mechanism to set the size control 72, 80 for selected portions of different diameters at predetermined longitudinal positions on workpiece W when said portions are positioned by carriage 123 in line with grinding wheel 14. Positioning bar 110 is shown and described as an illustration of means for performing this function. The probes may also be attached to any suitable coacting or matching control elements which function in a similar manner to signal the end of a machining operation. Positioning bar 110 may also have more than two positions for setting the sizing device.

In the front and back positions of caliper 10, air jets A and B respectively are encountered by appropriate cutoff means or valve member 15 on vertical support member 11. In the front position, air jet A controls the advance of caliper 10 as the diameter of workpiece W is reduced. In the back position, air jet B serves to provide a signal when caliper 10 is retracted so that caliper 10 and carriage 123 may be traversed to the next position.

Vertical support member 11 is supported in turn on parallel springs 21. Air jet A mounted on slide 20 is normally closed by the cut-off means 15 on support member 11 by virtue of the position in which caliper 10 is held by springs 21. As soon as caliper 10 engages workpiece W, regardless of the diameter, it is stopped, but slide 20 continues to move and air jet A moves away from the cut-off means 15 to provide a signal by the increased air flow, to stop the forward movement of caliper 10 with springs 21 exerting a predetermined force on caliper 10 against workpiece W. The movement of caliper 10 toward and from workpiece W is effected by hydraulic means. The longitudinal positioning movement of caliper 10 from one portion to another is effected by pneumatic means.

*Operation*

With carriage 123 in right hand position for grinding the left hand portion A of workpiece W, and caliper 10 also in right hand position opposite the right hand side of grinding wheel 14, the operator closes push button switch 1PB1 to complete a circuit to energize relay 5CR.

Relay contact 5CR1 provides a holding circuit through normally closed relay contact 4CR1.

Relay contact 5CR2 completes a circuit to energize wheel head advance solenoid 1, shifting valve 130 to the right against spring 131 and directing fluid under pressure to the head end of wheel feed cylinder 135 to advance feed piston 136 and grinding wheel 14 for a grinding operation.

Push button switch 1PB2 opens to deenergize gage relay 4CR through holding contact 4CR3.

The advance of grinding wheel 14 continues until feed completion limit switch 2LS is actuated by the feed mechanism when workpiece W is approximately to size.

Limit switch 2LS closes in a circuit through normally opened pressure switch 1PS which, at this time, is held closed because caliper 10 is not held against a workpiece, and air jet B is restricted by the cut-off means 15, building up pressure in pressure switch 1PS. The circuit continues through normally closed relay contact 2CR1 to energize relay 1CR.

Relay contact 1CR2 closes to energize gage solenoid 2 to shift gage valve 140 to the right, directing fluid under pressure to the left hand end of cylinder 41, shifting piston 40 to the right to advance shoes 70 and 71 and associated parts including probe 72 and core 81.

The advance of piston 40 continues until caliper 10 engages workpiece W, whereupon, caliper 10 stops, but the forward motion of vertical support member 11 and the cut-off means 15 continues.

Vertical springs 21 yield, allowing slide 20 to continue forward, causing an increase in the gap between the cut-off means or valve member 15 and air jet A, such that pressure drops, allowing pressure switch 1PS to transfer to its normally opened position. Pressure switch 1PS opening, deenergizes relay 1CR which, in turn, opens relay contact 1CR2 which, in turn, deenergizes gage solenoid 2.

Deenergizing solenoid 2 transfers valve 140 to the center position which blocks the hydraulic fluid, thereby stopping the forward motion of slide 20.

Piston 40 advances caliper 10 through springs 21 so that said caliper is held in engagement with workpiece W by tension of said springs. As the diameter of the work is reduced by grinding, springs 21 advance to maintain contact of caliper 10 with workpiece W.

The advance of caliper 10 by springs 21 continues until cut-off means 15 approaches air jet A and restricts the flow of air from said air jet.

Air pressure is increased to actuate pressure switch 1PS which completes a circuit from limit switch 2LS through normally closed relay contact 2CR1 to energize relay 1CR.

Relay contact 1CR2 completes a circuit to energize gage solenoid 2.

As previously described, solenoid 2, when energized, directs fluid to advance piston 40 to maintain a predetermined pressure on springs 21 which, in turn, maintain a constant pressure of caliper 10 against workpiece W.

As previously described, piston 40 continues to move to the right until air jet A is moved away from the cut-off means 15, reducing the pressure on pressure switch 1PS which opens to deenergize relay 1CR. Relay contact 1CR2 opens to deenergize gage solenoid 2, permitting valve 140 to be returned by spring 141 to central position to stop movement of piston 40 with springs 21 deflected to produce the desired pressure of caliper 10 on workpiece W.

The grinding operation continues and the advance of caliper 10 continues until the work diameter reaches a size which allows probe 72 and its core 81 to move to a position in coil 80 corresponding to the position in which probe portion 102 and core 101 are set by positioning bar 110 on carriage 123. It may be assumed that while caliper 10 is in contact with workpiece W, air jet A remains open, pressure switch 1PS remains open, relay 1CR is deenergized and normally closed relay contact 1CR1 is closed.

At this point, the transducers co-act to complete a circuit through an electronic relay 104 to energize relay 4CR.

Relay contact 4CR3 closes to hold relay 4CR energized.

Relay contact 4CR1 opens to deenergize relay 5CR.

Relay contact 5CR2 opens to deenergize wheel head advance solenoid 1.

Valve 130 is then returned to left hand position by spring 131 to direct fluid under pressure to the rod end of cylinder 135, shifting piston 136 and grinding wheel 14 to retracted position.

Relay contact 4CR2 closes to complete a circuit through normally closed relay contact 1CR1 to energize relay 2CR.

Relay contact 2CR1 opens in the circuit to previously deenergized relay 1CR.

Relay contact 2CR2 closes to energize caliper retract solenoid 3.

Solenoid 3 shifts valve 140 to the left, directing fluid under pressure into the right hand end of cylinder 41, shifting piston 40 and caliper 10 to retracted position.

In this position, air jet B is restricted and pressure switch 2PS is closed, completing a circuit to energize relay 7CR.

Relay contact 7CR1 closes to complete a circuit through limit switch contact 1LS1 which is closed when carriage 123 is in right hand position, to energize relay 10CR and the latch to relay 3CR.

If the work carriage 123 is in left hand position, the circuit from relay contact 7CR1 will be through limit switch contact 1LS2 and gage shift relay 3CR.

Relay contact 10CR1 closes to complete a circuit through normally closed relay contact 8CR2 to energize traverse left relay 9CR.

Relay contact 9CR1 closes in a circuit through limit switch 3LS to relay 5CR. However, the circuit is opened at limit switch 3LS until carriage 123 moves to the left, at which time, limit switch 3LS is closed and relay 5CR is energized.

Normally closed relay contact 9CR2 opens to deenergize relay 8CR.

Relay contact 9CR3 closes to hold relay 9CR through normally closed relay contact 8CR2.

Relay contact 9CR4 closes to energize traverse left solenoid 4.

Solenoid 4 shifts valve 150 to the left, directing fluid under pressure to the right hand end of traverse cylinder 160, shifting piston 161 and carriage 123 to the left against stop 126.

The movement of carriage 123 to the left operates through cam 200 to close limit switch 3LS.

Cam 210 actuates limit switch 1LS to open limit switch contact 1LS1 and close limit switch contact 1LS2.

Positioning bar 110 positions probe portion 102 to set the caliper 10 for the larger diameter B at the right hand end of workpiece W.

Cam 200 closes limit switch 3LS only after carriage 123 has completed its movement to the left so that relay 5CR cannot be energized to advance feed piston 136 when relay contact 9CR1 in the same circuit closes at the beginning of the traverse movement to the left.

Opening limit switch contact 1LS1, deenergizes relay 10CR and the latch of relay 3CR. Relay 9CR is held through relay contact 9CR3.

Limit switch contact 1LS1 completes a circuit to energize relay 3CR which is then held by the deenergized latch relay.

Relay contact 3CR1 closes in the circuit to relay 8CR, but normally closed relay contact 9CR2 in the same circuit, is open, since relay 9CR is energized. Therefore, traverse right relay 8CR cannot yet be energized.

Relay contact 3CR2 closes to energize shift solenoid 5.

Valve 170 is shifted to the right, directing fluid under pressure to the head end of cylinder 63, causing piston 60 to shift caliper 10 to left hand position.

As indicated above, cam 200 closes limit switch 3LS at the end of the movement to the left to energize relay 5CR, and advance grinding wheel 14 for grinding portion B of workpiece W.

When limit switch 2LS closes at the end of the feed movement, caliper 10 advances, opening air jet B and pressure switch 2PS to deenergize relay 7CR.

Relay contact 7CR2 opens to deenergize relay 9CR. The cycle is then repeated.

When caliper 10 is retracted at the end of the grinding operation on the second and last portion B, pressure from air jet B closes pressure switch 2PS to energize relay 7CR.

Relay contact 7CR2 completes a circuit through relay contact 3CR1 and normally closed relay contact 9CR2 to energize relay 8CR.

Relay contact 8CR3 closes to complete a circuit to traverse right solenoid 6. Solenoid 6 energizes to shift valve 150 to the right to direct pressure into the left hand end of cylinder 160, such that piston 161 and carriage 123 shift to the right against stop 127.

Positioning bar 110 will shift to a position in which probe portion 102 will be set for the small diameter A at the left end of workpiece W.

Cam 210 will release limit switch 1LS, closing limit switch contact 1LS1 and opening limit switch contact 1LS2.

Limit switch contact 1LS1 will complete a circuit to energize relay 10CR and the latch for relay 3CR.

The circuit to relay 3CR is opened by limit switch contact 1LS2.

Releasing relay 3CR opens relay contact 3CR2 to deenergize shift solenoid 5.

Shift valve 170 is returned to its normal right hand position, directing fluid to the rod end of cylinder 63 and moving piston 60 to shift caliper 10 to the right to be in position to engage left hand portion A of the next workpiece W.

The finished workpiece is removed from the machine and a new workpiece inserted.

The grinding operation is again initiated by closing push button switch 1PB.

I claim:

1. In a machine tool for successively machining axially spaced portions of a workpiece, each having a different diameter, means for rotatably supporting said workpiece, a cutting tool, a feed mechanism for advancing and retracting said cutting tool relative to said workpiece, a caliper movable into and out of engagement with said portions of said workpiece, means for exerting a uniform pressure of said caliper against successive portions of a workpiece regardless of diameter, comprising a caliper support member movable toward and away from said workpiece and means for moving said caliper support member, resilient elements for supporting said caliper on said support member, and co-acting control elements on said support member and on said resilient elements operable after said caliper engages said workpiece and in response to continued movement of said support member against said resilient elements, to stop said means for moving said support member.

2. In a machine tool for successively machining axially spaced portions of a workpiece, each having a different diameter, means for rotatably supporting said workpiece, a cutting tool, a feeding mechanism for advancing and retracting said cutting tool relative to said workpiece, a caliper movable into and out of engagement with said workpiece, comprising means for exerting a uniform pressure of said caliper against successive portions of a workpiece regardless of diameter including a caliper support member movable toward and away from said workpiece, and means for moving said support member, support means for said caliper comprising resilient elements for supporting said caliper on said support member, and co-acting control elements on said support member and on said resilient elements operable after said caliper engages said workpiece in response to movement of said support member against said resilient elements to stop said means for moving said support member after a predetermined movement beyond the point of contact between the workpiece and caliper, to exert a predetermined pressure of said caliper on said workpiece through said resilient elements.

3. In a machine tool for machining axially spaced portions of a workpiece, each having a different diameter, a base, a work supporting means rotatably supporting a workpiece on said base, a cutting tool, a feeding mechanism for advancing and retracting said cutting tool relative to said workpiece, means for effecting relative longitudinal movement of said work supporting means and said cutting tool, means to control said longitudinal movement to position said axially spaced portions of the workpiece successively in operative relation to said cutting tool, a caliper, a size responsive member in said caliper having a range of movement corresponding to a predetermined range of work diameters, said caliper being mounted for longitudinal and transverse movements relative to said workpiece, and means to effect said movements of said caliper in sequence with the longitudinal movement of said work supporting means to position said caliper in operative relation to the workpiece portion to be machined.

4. In a machine tool for machining axially spaced portions of a workpiece, each having a different diameter, a base, a work supporting means rotatably supporting a workpiece on said base, a cutting tool, a feeding mechanism for advancing and retracting said cutting tool relative to said workpiece, means for effecting relative longitudinal movement of said work supporting means and said cutting tool, means to control said longitudinal movement to position said axially spaced portions of the workpiece successively in operative relation to said cutting tool, a caliper mounted for transverse and longitudinal movements relative to said workpiece, and means to effect said movements of said caliper in sequence with the longitudinal movement of said work supporting means to position said caliper in operative relation to the workpiece portion to be machined.

5. In a machine tool for machining axially spaced portions of a workpiece, each having a different diameter, a base, a work supporting means rotatably supporting a workpiece on said base, a tool, a feeding mechanism for advancing and retracting said tool relative to said workpiece, means for effecting relative longitudinal movement of said work supporting means and said tool, means to control said longitudinal movement to position said axially spaced portions of the workpiece successively in operative relation to said tool, a caliper having work engaging members adapted to engage different diameters, means to effect transverse and longitudinal movements of said caliper relative to said workpiece and said tool, means operable when one of said axially spaced portions of said workpiece is machined to retract said caliper and said tool, means operable in response to one of said retracted elements to shift said work supporting means and said caliper longitudinally to the next machining position, control means operable by said work support to advance said tool toward the work, control means actuated by said tool advancing means for advancing said caliper to work engaging position, means operable when said caliper advances, to prepare said longitudinal moving means for movement of said caliper in the opposite direction to starting position when said caliper is retracted at the end of the grinding operation on the last portion of the workpiece, and control means operable in response to movement of said work supporting means in said opposite direction to hold said tool in retracted position.

6. In a machine tool for machining axially spaced portions of a workpiece, each having a different diameter, a base, a work supporting means rotatably supporting a workpiece on said base, a cutting tool, a feeding mechanism for advancing and retracting said cutting tool relative to said workpiece, means for effecting relative longitudinal movement of said work supporting means and said cutting tool, means to control said longitudinal movement to position said axially spaced portions of the workpiece successively in operative relation to said cutting tool, a caliper, a size responsive member in said caliper having a range of movement corresponding to a predetermined range of work diameters, and means operable to select a point in the range of said size responsive member corresponding to the diameter of a workpiece portion as said portion of the workpiece is placed in position to be machined.

7. In a machine tool for machining axially spaced portions of a workpiece, each having a different diameter, a base, a work supporting means rotatably supporting a workpiece on said base, a cutting tool, a feeding mechanism for advancing and retracting said cutting tool relative to said workpiece, means for effecting relative longitudinal movement of said work supporting means and said cutting tool, means to control said longitudinal movement to position said axially spaced portions of the workpiece successively in operative relation to said cutting tool, a caliper, a size responsive member in said caliper having a range of movement corresponding to a predetermined range of work diameters, a reference member operable during said longitudinal movement of said work supporting means to select a point in the range of said size responsive member corresponding to the diameter of the portion of the workpiece placed in machining position by said longitudinal movement, and means to actuate said feeding mechanism to retract said cutting tool when said size responsive member reaches a position corresponding to the setting of said reference member.

8. In a machine tool for machining axially spaced portions of a workpiece, each having a different diameter, a base, a work supporting means rotatably supporting a workpiece on said base, a cutting tool, a feeding mechanism for advancing and retracting said cutting tool relative to said workpiece, means for effecting relative longitudinal movement of said work supporting means and said cutting tool, means to control said longitudinal movement to position said axially spaced portions of the workpiece successively in operative relation to said cutting tool, a caliper, a size responsive member in said caliper having a range of movement corresponding to a predetermined range of work diameters, a reference member responsive to said longitudinal movement of said work supporting means to select a point in the range of said size responsive member corresponding to the diameter of the workpiece portion placed in machining position by said longitudinal movement, and means to actuate said feeding mechanism to retract said cutting tool when said size responsive member reaches a position corresponding to the setting of said reference member.

9. In a machine tool for machining axially spaced portions of a workpiece, each having a different diameter, a base, a work supporting means rotatably supporting a workpiece on said base, a cutting tool, a feeding mechanism for advancing and retracting said cutting tool relative to said workpiece, means for effecting relative longitudinal movement of said work supporting means and said cutting tool, means to control said longitudinal movement to position said axially spaced portions of the workpiece successively in operative relation to said cutting tool, a caliper, a size responsive member in said caliper having a range of movement corresponding to a predetermined range of work diameters, and means responsive to said longitudinal movement of said work supporting means to select a point in the range of said size responsive member corresponding to the diameter of the portion of the workpiece placed in machining position.

10. In a machine tool for machining axially spaced portions of a workpiece, each having a different diameter, a base, a work supporting means rotatably supporting a workpiece on said base, a cutting tool, a feeding mechanism for advancing and retracting said cutting tool relative to said workpiece, means for effecting relative longitudinal movement of said work supporting means and said cutting tool, means to control said longitudinal movement to position said axially spaced portions of the workpiece successively in operative relation to said cutting tool, a size control member having work engaging members adapted to engage different diameters including a probe member movable relative to the other work engaging members, a signal means movable with said probe member, means for urging said probe member into operative contact with a workpiece, a reference member, and means to position said reference member in accordance with the diameter of a workpiece portion which is in position for a machining operation to co-act with said signal means when said workpiece is machined to the diameter corresponding to the position of said reference member to retract said cutting tool from the workpiece.

References Cited in the file of this patent
UNITED STATES PATENTS
2,603,043    Bontemps _____ July 15, 1952